G. ZIEGLER, Jr.
CONNECTOR FOR PRESSURE GAGES AND TESTERS.
APPLICATION FILED MAR. 4, 1915.
1,175,577.
Patented Mar. 14, 1916.
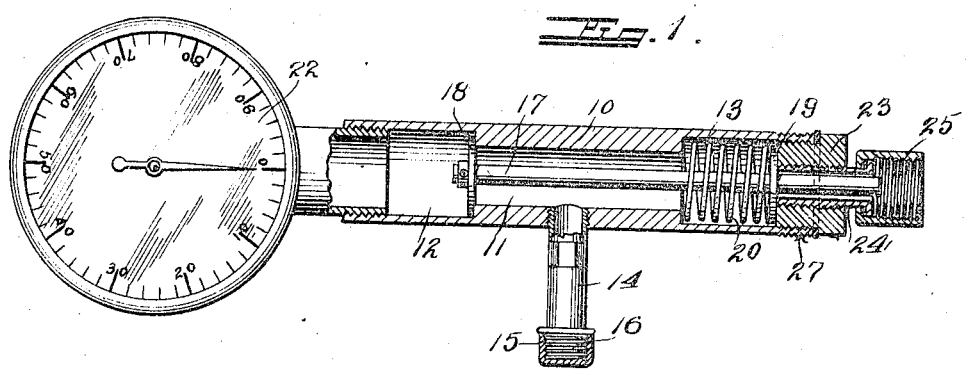
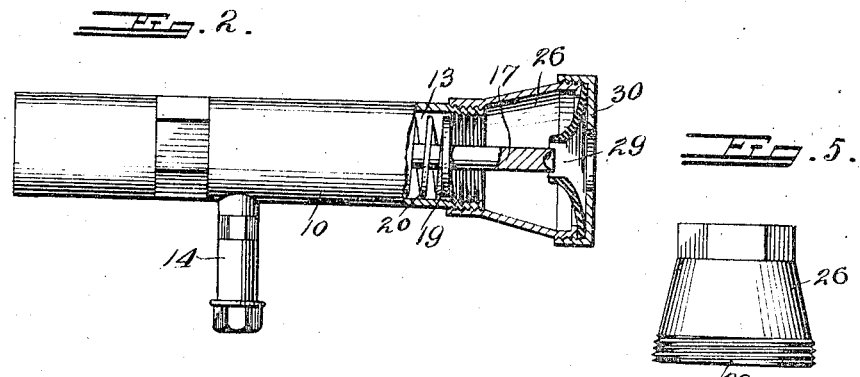
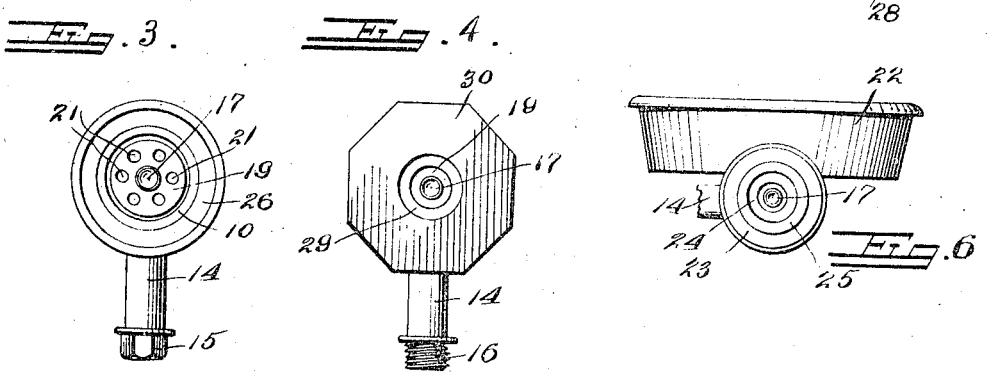
Witnesses
Edw. S. Hall.
Ross J. Woodward.
Inventor
George Ziegler Jr.
By Richard Bowen.
Attorney

UNITED STATES PATENT OFFICE.

GEORGE ZIEGLER, JR., OF KIMMSWICK, MISSOURI.

CONNECTOR FOR PRESSURE GAGES AND TESTERS.

1,175,577. Specification of Letters Patent. Patented Mar. 14, 1916.

Application filed March 4, 1915. Serial No. 12,064.

*To all whom it may concern:*

Be it known that I, GEORGE ZIEGLER, Jr., a citizen of the United States, residing at Kimmswick, in the county of Jefferson and State of Missouri, have invented certain new and useful Improvements in Connectors for Pressure Gages and Testers, of which the following is a specification.

This invention relates to an improved pressure gage and tester which is intended to be used for testing the pressure of an internal combustion engine cylinder or inflated tire and the principal object of the invention is to provide a device of the character described which can be connected either with the tire valve or cylinder.

Another object of the invention is to so construct the device that it may be connected with the tire valve when inflating the tire thus indicating the extent to which the tire has been inflated.

Another object of the invention is to provide a device of the character described which has a very simple construction but which is very efficient in operation and not liable to easily get out of order.

Another object of the invention is to so construct this device that it may be permanently connected with the tire valve or may be removably connected with the same.

This invention is illustrated in the accompanying drawings, wherein:—

Figure 1 is a view showing this device principally in longitudinal section and partially in elevation. Fig. 2 is a view partially in side elevation and partially in longitudinal section showing the device provided with a modified form of valve engaging means. Fig. 3 is a view in end elevation of the device shown in Fig. 2 with the end cap removed. Fig. 4 is a view similar to Fig. 3 with the end cap in place. Fig. 5 is a view in elevation of the cup which carries the cap and valve engaging collar. Fig. 6 is a view in end elevation of the attachment shown in Fig. 1.

The body portion 10 of this attachment is provided with a longitudinally extending opening or bore 11 which has its end portions enlarged to form housings 12 and 13 which housings have threaded outer end portions for a purpose to be hereinafter brought out. A valve controlled air inlet tube 14 extends from the body portion 10 at a point intermediate its ends and is provided with a cap 15 which is screwed upon the threaded neck 16 of the stem 14 so that if it is desired to leave this device upon the valve stem of the automobile tire it may be done so without danger of leakage.

Within the body portion 10 there is placed a slidably mounted actuating rod 17 which extends at one end beyond the body portion as shown in Figs. 1 and 2 and is provided adjacent one end with an abutment disk 18 mounted in the housing 12 and adjacent the opposite end with an abutment disk 19 positioned in the housing 13. A spring 20 is placed in housing 13 between the disk 19 and the inner end of the housing and serves to normally hold the actuating rod in the position shown in Fig. 1. It should be noted that each of these disks 18 and 19 is provided with openings 21 so that the passage of air through the body portion to the gage 22 will not be materially interfered with.

The plug 23 which is screwed into the outer end portion of the housing 13 is provided with a threaded opening in which is screwed the nipple 24 which rotatably carries the coupling 25. This coupling 25 is provided so that the tester and gage can be removably connected with the ordinary valve of an inflatable tire. If it is desired to test a cylinder the collar 26 will be screwed onto the threaded end portion 27 of the body portion 10 and the threaded outer end portion 28 of the collar will be screwed into the opening in which the spark plug fits. Of course the spark plug will be removed before the gage and tester is connected with the cylinder. In order to permit the device to be connected with the valve of a tire without its being necessary to use the coupling 25 there has been provided the flexible gripping disk 29 which is held in place by the cap 30.

The operation of this device is as follows: When it is desired to inflate a tire the coupling 25 can be screwed upon the valve tube of the tire and the pipe leading from the source of air supply is connected with the inlet tube 14. The air will then pass through the tube 14 into the body portion 10 and since the control valve of the tire tube has been opened by the actuating rod 17 the air will pass into the tire. At the same time the dial of the register 22 will show the amount of pressure under which the air in the tire is placed and thus there is no danger of the tire being inflated beyond a desired amount. After the tire has been inflated the desired amount the attachment can be removed or if desired it may be left upon the tire valve tube. It is better however to remove the attachment and replace the valve cap of the tire tube so that there will be no danger of the attachment becoming lost or broken. It is sometimes desirable to permit the attachment to be quickly removed or put in place and therefore the structure shown in Fig. 2 has been provided. With this structure the gage can be quickly put in place or removed as it is simply necessary to pass the valve tube of the tire through the cup-shaped gripping disk 29. The attachment will then be securely connected to the tire valve tube and as the valve of the tire tube is opened by the actuating stem 17 the air may be forced into the tire. After the tire has been inflated the attachment is removed and then put away until it is desired to again use the same.

If it is simply desired to test a tire to see if it is leaking the attachment will be put in place and the amount of pressure registered by the gage noted. After a short length of time the gage will be again inspected and if the pressure has gone down it will be indicated upon the dial of the gage thus showing that the tire leaks.

If it is desired to test a cylinder to see if the pistons do not fit properly or to see if the valves need regrinding the spark plug will be removed and after the collar 26 has been placed upon the valve and the cap 30 removed the threaded end of the collar will be screwed into the opening in which the spark plug is mounted and the engine then turned to bring the pistons to a compressing position. The gage will then be read to ascertain the amount of pressure produced and after a short length of time it will be again inspected to see if the pressure has been reduced thus indicating whether the valve or piston need to be repaired.

What is claimed is:

1. A device of the character described comprising a body portion provided with a longitudinally extending passageway and having the end portions of the passageway enlarged to form housings, registering means communicating with one of said housings, an actuating rod slidably mounted in said body portion and extending beyond the outer end of the second housing, an abutment disk carried by said rod and positioned in said first mentioned housing, a second abutment disk carried by said rod and positioned in the second housing, resilient means mounted in said second housing and engaging said second mentioned disk to yieldably hold said rod in a normal position, with the first mentioned disk in engagement with the inner end of the first mentioned housing, coupling means connected with said body portion and inclosing the outer end portion of said actuating rod, and an inlet tube communicating with said body portion intermediate its length.

2. A device of the character described comprising a body portion provided with an inlet and with a longitudinally extending passage having its outer end portions enlarged to form housings, an actuating rod slidably mounted in said body portion and provided with abutment disks positioned in said housings, resilient means positioned in one of said housings about said rod and engaging one of said disks, coupling means connected with said body portion and inclosing one end portion of said rod, registering means connected with the opposite end portion of said body portion.

3. A device of the character described comprising a body portion having a passageway formed therein and having enlarged end portions providing housings, a plug screwed into the outer end portion of one of said housings, a nipple carried by said plug, a valve stem engaging cap rotatably mounted upon said nipple, a rod slidably mounted in said passageway and extending through said nipple into said cap, abutment disks mounted upon said rod, one of the disks being positioned in each of the housings, and a spring positioned about said rod and engaging one of said disks to hold the same in engagement with said plug and the second disk in engagement with the inner end wall of its housing.

In testimony whereof I affix my signature in presence of two witnesses.

GEORGE ZIEGLER, JR.

Witnesses:
B. F. MEYER,
J. J. A. HILGERT.

Copies of this patent may be obtained for five cents each, by addressing the "Commissioner of Patents, Washington, D. C."